Nov. 15, 1966   A. E. GOLDFARB   3,285,584
ANIMATED MIXER AND DRINKING TUMBLER COMBINATION FOR CHILDREN
Filed June 11, 1964

INVENTOR
ADOLPH E. GOLDFARB
BY Herzig & Walsh
ATTORNEYS

United States Patent Office 3,285,584
Patented Nov. 15, 1966

3,285,584
ANIMATED MIXER AND DRINKING TUMBLER
COMBINATION FOR CHILDREN
Adolph E. Goldfarb, 7427 Varna St.,
North Hollywood, Calif.
Filed June 11, 1964, Ser. No. 374,374
6 Claims. (Cl. 259—108)

This invention relates to a mixing device, and more particularly to an animated mixer and drinking tumbler combination for children.

Many products which are healthful for children are in the form of dry powders which must be mixed with a liquid, such as milk or the like, before being consumed by a child. Some of these products do not mix satisfactorily with the liquid medium with a spoon. This sometimes requires employing blenders, food mixers and the like to prepare the product for consumption by the child. While generally satisfactory, these methods of preparing the product do have certain disadvantages.

One disadvantage resides in the fact that the child is sometimes too small to handle the mixing task with a powdered mixer.

Another disadvantage resides in the fact that there is less incentive for the child to drink the product when it is mixed by another person than would be the case if a child participated in the preparation of the product.

In view of the foregoing factors and conditions characteristic of methods of preparing or mixing dry products with a liquid medium for consumption by children, it is a primary object of the present invention to provide a new and useful animated mixer and drinking tumbler combination for children not subject to the disadvantages enumerated above and having means whereby a child can mix a powder with a liquid and drink the resulting product without removing the mixing device from the container in which the product is mixed.

Another object of the present invention is to provide an animated mixer which induces a child to prepare his own healthful liquid food products.

Yet another object of the present invention is to provide a device of the type described which is economical to manufacture and use.

A further object of the present invention is to provide a device of the type described wherein an animated mixer is provided with an aperture through which a drinking straw may be inserted into a drinking tumbler which serves as the container for the product during both the mixing operation and while the product is being consumed by a child.

According to the present invention, a drinking tumbler is provided with an encompassing side wall and a closed bottom wall. An annular collar is formed integrally with the bottom wall and serves as a seat for the lower end of a mixing device.

The mixing device includes a hub or head portion having internal threads adapted to engage external threads at the top of the tumbler to secure the mixing device thereto. An aperture is provided in the hub or head portion through which a drinking straw may be inserted so that liquid products can be consumed from the tumbler without removing the mixer. A shaft for the mixing device extends down through the hub portion into the tumbler and carries a mixing blade at its lower end which seats in the aforementioned annular collar. The shaft is rotated through suitable gearing and a crank mechanism which are mounted in the hub portion.

The upper end of the mixer shaft carries a suitable toy figure which revolves as a drink is mixed by the mixing device to add to the enjoyment of using the device.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

Figure 1:
FIGURE 1 is a perspective view of an animated mixer and drinking tumbler of the present invention.
Figure 3:
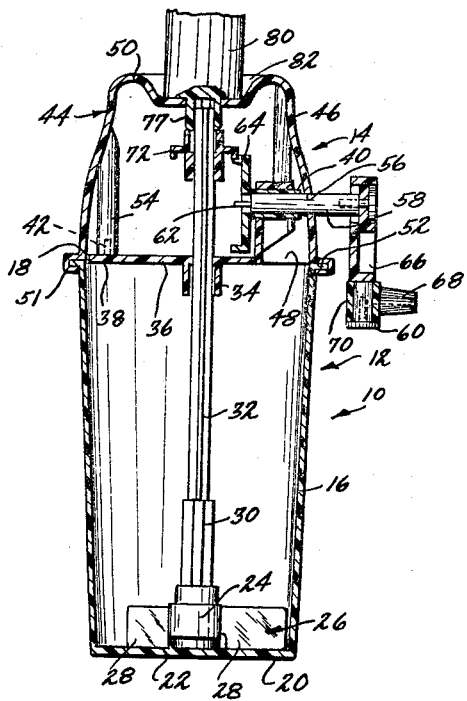
FIGURE 3 is an enlarged cross-sectional view of the device of FIGURE 1.

Referring again to the drawings, a device constituting a presently preferred embodiment of the invention, generally designated 10, includes a drinking tumbler 12 and a mixer 14.

The tumbler 12 includes an encompassing, upstanding side wall 16, an open top 18 and a closed bottom wall 20.

Figure 2:
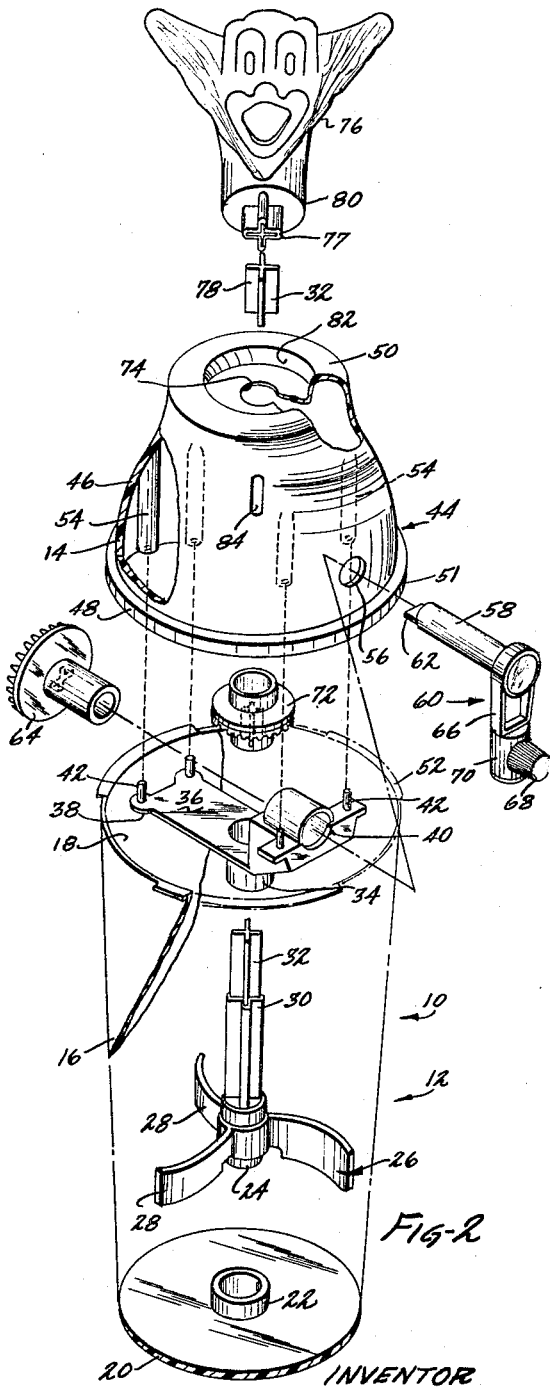
FIGURE 2 is an exploded, perspective view, on an enlarged scale, of the device of FIGURE 1.

An annular collar 22 is formed integrally with the bottom wall 20 and serves as a seat for a hub member 24 formed on a mixing blade assembly 26. The mixing blade assembly 26 may be provided with any suitable number and shape of blades, such as the three curved blades 28 shown in FIGURE 2. The hub 24 is provided with a shaped sleeve 30 which forms a socket for non-rotatably mounting the blade assembly 26 on a mixer shaft 32. The mixer shaft 32 preferably takes a non-cylindrical shape so that the blade assembly, and other parts to be hereinafter described, may be non-rotatably connected to the shaft 32 without employing set screws, adhesives, or the like. This is an important feature of the invention because it permits molding the device of the invention from a suitable plastic with a minimum number of parts which may be secured together without employing glue or the like by maintaining proper tolerances on all dimensions of the various parts.

The mixer shaft 32 extends through a hub 34 provided on a gear carrier 36. The hub 34 is preferably cylindrical so that the shaft 32 may be rotated relative thereto and is formed integrally with a base member 38 forming part of the gear carrier 36. The gear carrier 36 is preferably molded from a suitable plastic in a single operation and includes a crank journal 40 and a plurality of upstanding pins 42. The gear carrier 36 may be mounted in a mixer head 44 which includes an encompassing side wall 46, an open bottom 48, and a closed top wall 50. An annular flange 51 is provided at the open bottom 48 and is adapted to engage a set of arcuate projections 52 provided near the top of the drinking tumbler 12 so that the mixer 14 may be connected thereto. A plurality of counterbores 54 are provided on the inner surface of the encompassing side wall 46 and are engaged by the pins 42 with a snap fit so that the gear carrier 36 may be mounted in the mixer head 44 by inserting the gear carrier 36 through the open bottom 48. The gear carrier 36 is mounted in the mixer head 44 in such a position that the crank journal 40 is in alignment with an aperture 56 provided in side wall 46 for accommodation of the shaft 58 forming part of a crank 60. One end of the shaft 58 is provided with a tang 62 which non-rotatably connects the crank 60 to a bevel gear 64. The crank 60 is also provided with a crank arm 66 having a crank knob 68 connected thereto by a hub member 70 which, in turn, is pivotally connected to the crank arm 66 so that the knob 68 may be swung inwardly toward the mixer head 44 to minimize the girth required for a shipping container in which the device 10 may be shipped.

Another bevelled gear 72 is non-rotatably mounted on the mixer shaft 32 and meshes with the gear 64 so that it may be driven thereby when crank 60 is actuated. The mixer shaft 32 extends through an aperture 74 provided in the top wall 50 of mixer head 44. An animated display means or toy clown head 76 is rigidly affixed by a sleeve 77 to the upper end 78 of mixer shaft 32. The head 76 includes a cylindrical neck portion 80 which extends into a cylindrical recess 82 provided in the top wall 50 of mixer head 44. The cylindrical neck portion 80 bears against the top wall 50 to maintain the mixer shaft 32 and the gear 72 in assembled relation within the mixer head 44.

A drinking straw aperture 84 is provided in the mixer head 44 so that a child may insert a drinking straw 85 therethrough and drink the contents from the tumbler 12 without removing the mixer 14 therefrom.

In use, a child may put a quantity of powdered food ingredient into the tumbler 12 and fill it to a desired level with a suitable liquid, such as milk. The mixer 14 may then be connected to the tumbler 12 by seating the hub 24 in the collar 22 and by engaging the projections 52 on tumbler 12 with the flange 51 on mixer head 44. Whereupon the child can actuate crank 60 rotating gear 64 which, in turn, drives the gear 72 to rotate the mixer shaft 30 causing the mixing blade assembly 26 to thoroughly mix the dry ingredient with the liquid in tumbler 12. Rotation of the mixer shaft 32 causes the toy head 76 to revolve to the amusement of the child operating the mixer 14. Thus, the child has an incentive for mixing his own drink which may be consumed without removing the mixer 14 from the tumbler 12 by inserting the drinking straw 85 through the aperture 84.

After use, the mixer 14 may be disassembled from the tumbler 12, whereupon the tumbler 12 and the mixer 14 can be washed in a normal manner.

While the particular device herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:

1. An animated toy food mixer comprising:
   a mixer head having an encompassing side wall, an open bottom, and a closed top wall, said top wall having a first aperture provided therein;
   a mixer shaft rotatably mounted in said mixer head, said mixer shaft having one upper end extending through said first aperture and another lower mixing end extending through said open bottom of said mixer head;
   crank means mounted in said mixer head in operative engagement with said mixer shaft for rotating said mixer shaft upon actuation of said crank means; and
   means that simulates the appearance of a recognizable object fixedly mounted on said one upper end of said mixer shaft for engagement with said top wall to maintain said mixer shaft in assembled relation with the said mixer head and to rotate incident to the rotation of said mixer shaft to provide animation incident to the mixing of food by said mixing shaft.

2. The food mixer of claim 1 including a drinking straw aperture provided in said mixer head.

3. An aminated food mixer for children comprising:
   a mixer head having an encompassing side wall, an open bottom, and a closed top wall, said top wall having an aperture provided therein;
   a gear carrier mounted in said mixer head, said gear carrier including a hollow cylindrical hub member and a crank journal;
   a non-cylindrical mixer shaft extending through said aperture in said top wall and through said hollow cylindrical hub;
   a crank member rotatably mounted in said crank journal;
   gear means connecting said mixer shaft to said crank member for rotation thereby; and
   animated display means rigidly affixed to one end of said mixer shaft, said display means being engageable with said top wall to maintain said gear means and said mixer head in assembled relation with said mixer shaft.

4. The mixer of claim 3 wherein said mixer head includes internal thread means for connecting said mixer to external thread means on a drinking tumbler and wherein said mixer head also includes a drinking straw aperture provided in said encompassing side wall, whereby a drinking straw can be inserted through said drinking straw aperture for withdrawing the contents from said drinking tumbler without removing said mixer therefrom.

5. The combination of claim 4 including a drinking tumbler having an encompassing side wall, an open top, and a closed bottom wall; and external thread means provided on said drinking tumbler near said open top, said external thread means being engageable by said internal thread means to connect said mixer head to said drinking tumbler.

6. A child's food mixer comprising:
   (a) a generally cylindrical upright drinking container having an open upper end,
   (b) a cover releasably mounted over said open upper end of said drinking container,
   (c) a generally vertical mixer shaft rotatably mounted centrally in said cover and extending downwardly into said drinking container,
   (d) crank drive means mounted on said cover and operatively connected to said mixer shaft to rotate said shaft, said crank drive means including a handle disposed at one side of said cover to operate said drive means to rotate said shaft, and
   (e) an element simulating the appearance of a recognizable object fixedly secured to the upper end of said shaft and extending above said cover for common rotation with said shaft to provide animation incident to mixing of food by said shaft.

References Cited by the Examiner

UNITED STATES PATENTS

| | | | |
|---|---|---|---|
| 1,612,281 | 12/1926 | Goetz | 259—118 |
| 2,731,751 | 1/1956 | Green | 215—1 |
| 3,009,686 | 11/1961 | Kaplan | 259—108 |

FOREIGN PATENTS 96,599  10/1922  Switzerland.

WALTER A. SCHEEL, *Primary Examiner.*

WILLIAM I. PRICE, *Examiner.*

R. W. JENKINS, *Assistant Examiner.*